United States Patent Office 3,409,674
Patented Nov. 5, 1968

3,409,674
PREPARATION OF α-DICARBONYL DERIVATIVES
FROM β-KETOSULFOXIDES
Theron L. Moore, Norfolk, Va., assignor to The Procter & Gamble Company, Cincinnati, Ohio, a corporation of Ohio
No Drawing. Filed Dec. 22, 1966, Ser. No. 603,738
8 Claims. (Cl. 260—592)

ABSTRACT OF THE DISCLOSURE

A process for preparing α-dicarbonyl derivatives from β-ketosulfoxides by acidic rearrangement in an acid liquid medium containing a protic solvent, i.e., primary and secondary alcohols and water, wherein at least one equivalent of an oxidizing reagent is present per mole of β-ketosulfoxide raw material to minimize formation of undesirable sulfur containing compounds and to insure reaction equilibria favorable to product recovery.

---

This invention relates to the preparation of α-dicarbonyl derivatives and has for its general object the synthesis of α-dicarbonyl derivatives from β-ketosulfoxides. More particularly, the invention provides for processes whereby either aliphatic or aromatic α-dicarbonyl derivatives are synthesized and recovered in excellent yield from β-ketosulfoxide precursors. Specifically, the invention provides processes whereby not only aromatic α-dicarbonyl compounds can be synthesized and recovered from aromatic β-ketosulfoxide precursors, but also the previously difficult to synthesize, and/or to recover reasonable yield, aliphatic α-dicarbonyl derivatives can be obtained. The α-dicarbonyl derivatives are prepared and purified in the form of their acetals, since the thermally stable acetal derivatives are easily manipulated and purified.

In most reactions the acetal derivatives are completely equivalent to, and can be directly substituted for, the corresponding α-dicarbonyl compound. In the event that preparation in the form of the α-dicarbonyl compound is specifically desired, the transformation from acetal derivative to α-dicarbonyl compound is easily accomplished by treating the acetal derivative with a trace of acid followed by distillation to remove the resulting alcohol. α-Dicarbonyl derivatives, particularly aliphatic α-dicarbonyl derivatives are very useful for and in, for example, the synthesis of perfumes and flavorings. The aliphatic α-dicarbonyl derivatives are also useful in the synthesis of pharmaceuticals, dyestuffs and metal complexing agents.

Heretofore, the Pummerer acidic rearrangement of aromatic β-ketosulfoxides to yield aromatic α-dicarbonyl compounds in reasonable yield and recoverable from reaction mixtures by crystalline separation has been known, as reported for example by W. J. Kenney, J. A. Walsh, and D. A. Davenport, Journal of the American Chemical Society, 83, 4019 (1961), although the synthesis is difficult and tedious to carry out. The rearrangement of aliphatic β-ketosulfoxides according to the Pummerer rearrangement, however, results in oily and intractable equilibrium reaction mixtures from which the recovery of particular and desired α-carbonyl derivatives is either extremely difficult, requiring chromatographic or other sophisticated laboratory techniques, or impossible. In either case the low yield from such a Pummerer acidic rearrangement operated with aliphatic β-ketosulfoxides is such that no practical recovery of a particular aliphatic α-dicarbonyl derivative can be obtained.

The difficulties encountered in preparing aliphatic α-dicarbonyl derivatives from aliphatic β-ketosulfoxides are two-fold. First, an acidic rearrangement of the Pummerer type leads to a reaction mixture of the desired acetal α-dicarbonyl derivative in equilibrium mixture with its hydrate, hemi-thioacetal, dimeric acetal and other derivatives. This equilibrium mixture formed by further acid-catalyzed reactions has proven difficult or impossible to separate into pure components. Second, mercaptan contaminants are generated during the Pummerer acidic rearrangement and combine with the components of the equilibrium mixture to form mercaptal derivatives. The mercaptal derivatives have proven almost impossible to separate from the small amounts of any desired aliphatic α-dicarbonyl compound which may exist in the rearrangement reaction mixture.

The general equation typifying the Pummerer acidic rearrangement and the resulting intractable equilibrium reaction mixture as carried out with a β-ketosulfoxide starting material is illustrated below. In the general equation, $R_1$ is selected from the group consisting of aliphatic, aryl, and alkaryl hydrocarbon groups containing 1 to about 18 carbon atoms and derivatives thereof, $R_2$ is selected from the group consisting of hydrogen and aliphatic hydrocarbon groups containing 1 to about 4 carbon atoms and $R_3$ is an aliphatic hydrocarbon group containing 1 to about 4 carbon atoms.

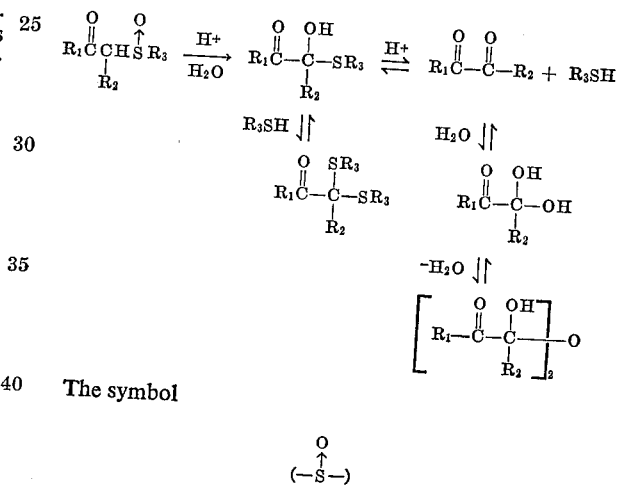

The symbol

is used to represent the sulfoxide group in the general equation above and hereinafter for purposes of illustrating the invention and is not necessarily indicative of the actual structure which is believed to involve a polar bond.

It can readily be appreciated from the intractable equilibrium situation presented above, that an effective synthesis method for rearranging aliphatic β-ketosulfoxides into their respective and recoverable aliphatic α-dicarbonyl counterparts is desirable. Means of influencing the rearrangement equilibria in said synthesis method to increase the yield of a desired α-dicarbonyl compound in a separable reaction mixture substantially free from methyl mercaptan or other reactable sulfur contaminants is extremely desirable. It can be equally appreciated that a less tedious method of synthesizing aromatic α-dicarbonyl derivatives from aromatic β-ketosulfoxides by a more manageable method resulting in increased yield is very desirable, even though these compounds are obtainable by the Pummerer rearrangement and other methods available in the prior art.

Accordingly, it is an object of this invention to prepare α-dicarbonyl derivatives by methods which avoid the aforesaid defects and in which the advantages herein-before indicated are inherent.

It is a more specific object of this invention to provide processes for the synthesis of α-dicarbonyl derivatives and their corresponding α-dicarbonyl compounds from β-ketosulfoxides.

In general, the objects of this invention can be realized by heating and reacting β-ketosulfoxide precursors of α-dicarbonyl derivatives in an acidic liquid medium or solvent therefor made up of (1) a member selected from the group consisting of primary and secondary acetal forming alcohols and water and (2) from one to about two equivalents, per mole of β-ketosulfoxide entering the reaction, of an oxidizing reagent selected from the group consisting of $I_2$, $Br_2$, $NO_3^-$, $MnO_4^-$, $CrO_4^=$ and $H_2O_2$. The α-dicarbonyl derivatives so formed can be recovered from the reaction mixture by conventional procedures. The presence of the oxidizing reagent, as explained more fully hereinbelow, results in the increased yield of recoverable α-dicarbonyl derivatives and minimizes the formation of sulfur contaminants and α-dicarbonyl derivatives containing sulfur. The use of more than one to about two molecular equivalents, preferably about 1.1 molecular equivalents, of the oxidizing reagent selected is considered wasteful of the oxidizing reagent and can result in reduced yields of the desired α-dicarbonyl product.

In addition to the foregoing acidic liquid medium components, the addition of an inert solvent as a component of the acidic liquid medium is desirable when water is used as the acetal (hydrate) forming component. The prescence of the inert solvent component is desirable to insure the solution of the β-ketosulfoxide starting material to form a homogenous reaction mixture when water is present. Also the presence of an inert solvent is desirable to insure mobility and contact between the reaction components in the case of starting materials which are solids at room temperatures. Even when primary and secondary acetal forming alcohols are present in the acidic liquid medium, the presence of an inert solvent is not detrimental to carrying out the process of the present invention. Suitable inert solvents for use in the acidic liquid medium of the present invention are, for example, 1,2-dimethoxyethane (monoglyme), bis-2-methoxyethyl ether (diglyme), acetone, dimethyl formamide, methyethyl ketone and hexamethyl phosphoramide.

More particularly the preparation of α-dicarbonyl derivatives according to the present invention can be carried out with β-ketosulfoxide precursors of α-dicarbonyl derivatives, which β-ketosulfoxides have the general formula

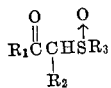

wherein, as defined above and throughout the present specification, $R_1$ is selected from the group consisting of saturated aliphatic, aryl and alkaryl hydrocarbon groups containing 1 to about 18 carbon atoms and derivatives thereof, $R_2$ is selected from the group consisting of hydrogen and saturated aliphatic hydrocarbon groups containing 1 to about 4 carbon atoms and $R_3$ is an aliphatic hydrocarbon group containing 1 to about 4 carbon atoms.

Said β-ketosulfoxide precursors of α-dicarbonyl derivatives are heated with provision for reflux for about 0.2 hour to about 2 hours, preferably about 0.5 hour to about 1.0 hour, at a temperature of about 25° C. to about 100° C. to cause their reaction in an acidic liquid medium as stated above.

It has also been found preferable in the case where bromine is used as the oxidizing reagent to add the bromine after effecting the reaction, i.e. acidic rearrangement, and continuing the heating about 0.5 hour to promote the beneficial equilibria shifts.

A preferred process for the preparation of an α-dicarbonyl acetal from a β-ketosulfoxide in acidic liquid medium using methanol as the acetal forming alcohol and iodine ($I_2$) as the oxidizing reagent by way of illustration proceeds, during a 0.5 hour to 1.0 hour period of heating with provision for reflux, according to the following general reaction equation, wherein $R_1$, $R_2$ and $R_3$ are defined as stated above:

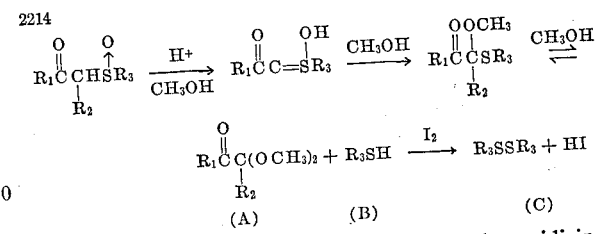

The removal of the mercaptan (B) by the oxidizing action of the iodine to form the disulfide (C), which sulfur contaminant is readily separable from the α-dicarbonyl acetal (A) by distillation, shifts the equalibrium to favor the formation of the α-dicarbonyl acetal. The use of iodine is also favorable in that the hydrogen iodide formed further favors the initial acidic rearrangement.

As previously stated the reacting of the β-ketosulfoxides takes place in an acidic liquid medium comprising at least one member selected from the group consisting of primary and secondary acetal forming alcohols and water. Suitable and more commonly used acetal forming alcohols are, for example, methyl alcohol, ethyl alcohol and isopropyl alcohol. Propyl, butyl, pentyl, 1-hexyl, iso-butyl, secondary butyl, 2-hexyl, 3-hexyl and 2-ethyl-hexyl alcohols as well as 2-hydroxy-3-methyl-pentane, 2-hydroxy-3-methyl-hexane, 3-hydroxy-4-methyl-hexane are additional examples of acetal forming alcohols suitable for use in practicing the invention. As stated above the acidic liquid medium also contains at least one equivalent, per mole of β-ketosulfoxide entering the reaction, of an oxidizing reagent selected from the group consisting of $I_2$, $Br_2$, $NO_3^-$, $MnO_4^-$, $CrO_4^=$ and $H_2O_2$. The presence of some of the oxidizing reagents listed above, e.g., $I_2$, $Br_2$ or $NO_3^-$, in the stated amounts will in themselves render the liquid medium sufficiently acidic. A trace or catalytic amount of acidic substance is all that is required for the rearrangement to proceed, although additional amounts of acid are not harmful. In the case where the oxidizing reagent is not acidic in nature, for example $H_2O_2$, or where additional acid is deemed desirable to hasten acidic rearrangement, an acidic substance, for example dilute sulfuric, hydrochloric, perchloric and hydrobromic acids or acid salts such as sodium bisulfate can be used to render the liquid medium acidic.

The common sources of the oxidizing reagents, $NO_3^-$, $MnO_4^-$, and $CrO_4^=$, are respectively nitric acid, potassium permanganate and potassium chromate, but other sources of the oxidizing ions, for example sodium permanganate, will serve as well.

Suitable β-ketosulfoxide precursors of α-dicarbonyl compounds for use in practicing the present invention are, for example, 2-ketoundecyl methyl sulfoxide, 2'-methylsulfinyl-4-methoxyacetophenone, 2'-methylsulfinyl-acetophenone, 2'-methylsulfinyl-4-methylacetophenone, 2-ketononadecyl methyl sulfoxide, 2'-methylsulfinyl-4-fluoroacetophenone, 2'-methylsulfinyl-2-methylacetophenone, 2-ketodecyl methyl sulfoxide, 2-ketopentadecyl methyl sulfoxide, 2-ketopentyl methyl sulfoxide, 2-keto-4-methylpentyl methyl sulfoxide, 2-methylsulfinyl-3-oxo-pentane, 2-methylsulfinyl-3-oxo-dodecane, 2-methylsulfinyl-3-oxo-butane, 5-butanesulfinyl-6-oxo-tetracosane, 2-methylsulfinyl-3-oxo-hexane and 2-ketopentyl methyl sulfoxide.

Such β-ketosulfoxide precursors of α-dicarbonyl compounds can be prepared according to the processes disclosed in the copending application Ser. No. 444,068, filed Mar. 30, 1965, by Warren I. Lyness and David E. O'Connor now Patent No. 3,355,494, wherein salts of sulfinyl carbanions are reacted with acylating agents, for example carboxylic esters, acyl chlorides, and acid anhydrides, to prepare β-ketosulfoxides.

Subsequent to the reacting period the α-dicarbonyl derivative synthesized can be recovered from the reaction mixture by conventional procedures of extraction and distillation. For example, the reaction mixture can be cooled and then stripped of any excess of acetal forming alcohol by placing the reaction mixture under vacuum. When water is used as the acetal (hydrate) forming component of the acidic liquid medium, the use of such a stripping technique is not usually necessary, since any excess water forms a separate phase and is thus separated from the organic phase containing α-dicarbonyl product.

Following substantial removal of the acetal forming alcohol, excess oxidizing reagent, for example iodine in the reaction mixture can be removed from the reaction mixture by pouring the reaction mixture into a saturated solution of sodium thiosulfate. The acid reaction mixture can also be neutralized with a base, for example, sodium carbonate, sodium bicarbonate, sodium hydroxide and potassium carbonate. The α-dicarbonyl derivative can then be extracted from the stripped and neutralized reaction mixture with, for example, chloroform, methylene chloride, ethyl acetate, hexane, petroleum ether or other commonly used organic extraction solvent. The solvent solution can then be dried and the solvent stripped therefrom to leave a substantially solvent free extract prior to recovering the α-dicarbonyl product by distillation. The distillation residue either can contain the disulfide products formed during the reaction, or the disulfide products may distill off leaving the α-dicarbonyl derivative as the distillation residue.

Other means of effecting the separation and recovery of the synthesized α-dicarbonyl derivative from the reaction mixture include, for example, extraction with an organic solvent directly from the cooled reaction mixture and physical separation from the reaction mixture in the cases where the α-dicarbonyl product is a solid.

The following examples will illustrate in detail the manner in which the invention can be practiced. It will be understood, however, that the invention is not confined to the specific limitations set forth in the individual examples, but rather to the scope of the appended claims.

EXAMPLE I 20 grams (.086 mole) of the β-ketosulfoxide, 2-keto-undecyl methyl sulfoxide, are dissolved in 100 ml. of methyl alcohol containing 15 grams (.059 mole or 1.4 equivalents per mole of β-ketosulfoxide starting material) of iodine and heated for 1 hour at 65° C. with provision for reflux. After reaction during the heating period, the solution is allowed to cool, and the residual methyl alcohol is substantially removed by evaporating or stripping it from the solution under a water aspirator induced vacuum generating an absolute pressure equivalent to 20 mm. of mercury.

The solution with the methyl alcohol substantially removed is poured into 100 ml. of saturated aqueous sodium thiosulfate solution, and the composite solution is extracted with three successive 50 ml. portions of chloroform. The chloroform extraction solution is then dried over anhydrous magnesium sulfate whereupon the chloroform is stripped from the extraction solution under water aspirator vacuum as was the methyl alcohol. The α-dicarbonyl derivative product is distilled from the extraction residue to separate it from disulfide by-product as well as any remaining alcohol.

The distillation yields 12.4 grams of an oily liquid boiling at 95° C. at an absolute pressure equivalent to 0.5 mm. of mercury. The α-dicarbonyl product is identified as 1,1-dimethoxy-2-oxo-undecane by spectral means and by elemental analysis. 1,1-dimethoxy-2-oxo-undecane forms a product useful as a chelating agent for gold when condensed with the amine, o-aminophenol.

When the process of Example I is carried out using one equivalent per mole of β-ketosulfoxide starting material of $Br_2$, $NO_3^-$, $MnO_4^-$, $CrO_4^=$ or $H_2O_2$, in place of the iodine the results are similar in that the same α-dicarbonyl product, 1,1-dimethoxy-2-oxo-undecane results, although the yields are found to be somewhat reduced from those obtained when iodine is used as the oxidizing reagent.

EXAMPLE II 10 grams (0.032 mole) of the β-ketosulfoxide, 5-butyl-sulfinyl-6-oxo-tetracosane, are dissolved in 100 ml. of ethyl alcohol. The ethyl alcohol contains 1.5 equivalents of iodine based on the starting moles of β-ketosulfoxide. The ethyl alcohol solution of β-ketosulfoxide with iodine is then refluxed at 80° C. for 2 hours.

After reaction during the reflux period, the solution is cooled and the residual ethyl alcohol is substantially removed by stripping it from the solution under an absolute pressure equivalent to 20 mm. of mercury, which absolute pressure is generated by a water aspirator. The solution with the ethyl alcohol substantially removed is poured into 100 ml. of saturated sodium thiosulfate solution and the composite solution is extracted with three 50 ml. portions of chloroform. The chloroform extraction solution is then dried over anhydrous magnesium sulfate whereupon the chloroform is stripped from the extraction solution under an absolute pressure reduced by water aspirator vacuum as was the ethyl alcohol.

The α-dicarbonyl derivative crystallizes when the chloroform is removed to give a fair yield of a crystalline product identifiable as 5,5-diethoxy-6-oxo-tetracosane, which product is also useful as an intermediate in the preparation of a chelating agent in the manner of Example I.

EXAMPLE III 15 grams (0.092 mole) of 2-methylsulfinyl-3-oxo-hexane are dissolved in 50 ml. of methyl alcohol. The methyl alcohol contains 1.2 equivalents of iodine based on the amount of the above named β-ketosulfoxide entering the reaction. The methyl alcohol solution of β-ketosulfoxide with iodine is then refluxed at 65° C. for 2 hours.

After reaction during the reflux period, the solution is cooled, stripped of residual alcohol by evaporation as in Example I and poured into 150 ml. of water containing an excess amount of sodium thiosulfate. The sodium thiosulfate solution is extracted with 100 ml. of chloroform. The chloroform is then evaporated from the chloroform extraction solution under an absolute pressure of 20 mm. of mercury. The α-dicarbonyl product is then vacuum distilled from the residue of the chloroform extraction liquor.

The distillation yields a 45% theoretical yield of 2,2-dimethoxy-3-oxo-hexane, based on the amount of β-ketosulfoxide starting material. The α-dicarbonyl product, 2,2-dimethoxy-3-oxo-hexane exhibits a pleasant floral perfume odor.

EXAMPLE IV 36.8 grams (0.32 mole) of the β-ketosulfoxide, 2 keto-pentyl methyl sulfoxide, are dissolved in 500 ml. of methyl alcohol containing 45.7 grams (0.18 mole or 1.1 equivalents based on the starting moles of β-ketosulfoxide) of iodine and heated with refluxing for one hour at 62° C. After reaction during the heating period, the solution is allowed to cool and the residual methyl alcohol is substantially removed by evaporation under a water aspirator vacuum.

The solution with the methyl alcohol substantially removed is then poured into 150 ml. of water containing 0.4 mole of sodium thiosulfate, and the composite solution is extracted with three successive 50 ml. portions of chloroform. The chloroform extraction solution is then dried over anhydrous magnesium sulfate before stripping off the chloroform under water aspirator vacuum.

The α-dicarbonyl derivative is vacuum distilled from the extraction residue to separate it from disulfide by-product together with the remaining solvent and alcohol. The distillation results in a good yield of an oily liquid. The oily liquid is identifiable as the α-dicarbonyl derivative, 1,1-dimethoxy-2-oxo-pentane, which exhibits a floral perfume note.

EXAMPLE V 5 grams (0.037 mole) of the β-ketosulfoxide, 2-methylsulfinyl-3-oxo-butane, are dissolved in 25 ml. of methyl alcohol containing 5.1 grams (0.02 mole or 1.1 equivalents per mole of β-ketosulfoxide starting material) of iodine. A drop of sulfuric acid is added to acidify the solution, and the acidified solution is heated and refluxed for 1.5 hours at approximately 62° C.

After reaction during the refluxing period, the solution is allowed to cool and the residual methyl alcohol is substantially removed by evaporation under a water aspirator induced vacuum equivalent to an absolute pressure of 20 mm. of mercury. An excess of solid sodium thiosulfate is added to the methyl alcohol stripped solution and stirred for approximately 10 hours. After the stirring period the excess sodium thiosulfate is filtered from the solution prior to distilling off a fair yield of the α-dicarbonyl product at atmospheric pressure.

The α-dicarbonyl product is the dimethoxyketal of biacetyl, which product exhibits a strong, somewhat butter-like, odor.

EXAMPLE VI 3.64 grams (0.02 mole) of the β-ketosulfoxide, 2'-methylsulfinyl acetophenone are dissolved in 25 ml. of isopropyl alcohol containing 3.8 grams (0.125 mole or 1.25 equivalents per mole of β-ketosulfoxide starting material) of iodine, and the resulting solution is refluxed for 2 hours at 65° C.

After reaction during the refluxing period, the solution is allowed to cool and the residual isopropyl alcohol is substantially removed by stripping it from the solution under a water aspirator vacuum. The solution with the isopropyl alcohol substantially removed is poured into 100 ml. of saturated aqueous sodium thiosulfate solution, and the composite solution is extracted with three successive 50 ml. portions of chloroform. The chloroform extraction solution is dried over anhydrous magnesium sulfate whereupon the chloroform is stripped from the extraction solution by evaporation under water aspirator vacuum as was the isopropyl alcohol.

The α-dicarbonyl derivative product is then distilled from the extraction residue to separate it from disulfide by-product and any remaining alcohol. The distillation yields 4.0 grams of an oily liquid boiling at 74–74.5° C. at an absolute pressure equivalent to 0.25 mm. of mercury for a theoretical yield of 84% based on the amount of β-ketosulfoxide entering the reaction.

The α-dicarbonyl derivative is identified as 1,1-diisopropoxy-2-oxo-2-phenylethane, which product is useful because it exhibits a weak floral, specifically heliotrope, perfume odor.

When methyl alcohol is used in place of the isopropyl alcohol in the process of Example VI, the α-dicarbonyl derivative is identified as 1,1-dimethoxy-2-oxo-2-phenylethane and exhibits a pronounced heliotrope odor.

EXAMPLE VII 6.7 grams (0.031 mole) of the β-ketosulfoxide, 2-keto decyl methyl sulfoxide are dissolved in 50 ml. of methyl alcohol containing 5.1 grams (0.02 mole or 1.3 equivalents per mole of β-ketosulfoxide starting material) of iodine and refluxed for 1 hour at 60°–65° C.

After reaction during the refluxing period, the solution is allowed to cool and the residual methyl alcohol is substantially removed by stripping it from the solution under a vacuum equivalent to an absolute pressure of 20 mm. of mercury induced by a water aspirator.

The solution with the methyl alcohol substantially removed is poured into 100 ml. of water containing 0.045 mole of sodium thiosulfate solution, and the composite solution is extracted with three successive 50 ml. portions of chloroform.

The chloroform extraction solution is dried over anhydrous magnesium sulfate whereupon the chloroform is stripped from the extraction solution by evaporation under water aspirator vacuum as was the methyl alcohol.

The α-dicarbonyl derivative product is distilled from the extraction residue to separate it from disulfide by-product and any remaining alcohol. The distillation yields an oily liquid boiling at 81–84° C. at an absolute pressure equivalent to 0.7 mm. of mercury. The α-dicarbonyl derivative is identified as 1,1-dimethoxy-2-oxo-nonane, which product is useful in that it exhibits the odor of raw coconut.

EXAMPLE VIII 46.4 grams (0.20 mole) of the β-ketosulfoxide, 2 keto-undecyl methyl sulfoxide, are dissolved in 300 ml. of water together with 200 ml. of 1,2-dimethoxy-ethane (monoglyme) containing 30.0 grams (0.12 mole or 1.2 equivalents per mole of β-ketosulfoxide starting material) of iodine. The resulting solution is heated and refluxed for one hour at approximately 90° C. After reaction during the refluxing period, the solution is allowed to cool and the residual monoglyme is substantially removed from the solution by evaporating it under a water aspirator vacuum.

An excess of sodium thiosulfate is added to the aqueous solution with the monoglyme substantially removed, and the composite solution is extracted with three successive 50 ml. portions of chloroform. The chloroform extraction solution is then dried over anhydrous magnesium sulfate before stripping off the chloroform under water aspirator vacuum.

The α-dicarbonyl derivative crystallizes as a white crystalline product in a yield of 95% based on the amount of β-ketosulfoxide starting material. The product α-dicarbonyl derivative is identifiable as the hydrate of α-keto-undecanal (1,1-dihydroxy-2-oxo-undecane) and exhibits a floral scent.

EXAMPLE IX 10 grams (0.062 mole) of the β-ketosulfoxide, 2-keto-4-methylpentyl methyl sulfoxide, are dissolved in 100 ml. of methyl alcohol containing 9 grams (0.035 mole or 1.1 equivalents per mole of β-ketosulfoxide starting material) of iodine and the solution is refluxed for 1.5 hours at 65° C.

After reaction during the refluxing period, the solution is allowed to cool and the residual methyl alcohol is substantially removed by stripping it from the solution under a water aspirator induced vacuum generating an absolute pressure equivalent to 20 mm. of mercury.

The solution with the methyl alcohol substantially removed is poured into 100 ml. of saturated aqueous sodium thio-sulfate solution, and the composite solution is extracted with three successive 50 ml. portions of chloroform. The chloroform extraction solution is then dried over anhydrous magnesium sulfate whereupon the chloroform is stripped from the extraction solution under water aspirator vacuum as was the methyl alcohol.

The α-dicarbonyl derivative is distilled at atmospheric pressure from the extraction residue to separate it from disulfide by-product and any remaining alcohol.

The distillation results in a moderate yield of an oily liquid, which liquid exhibits a floral scent and is identifiable as 1,1-dimethoxy-2-oxo-4-methyl pentane by spectral means.

EXAMPLE X 1.7 grams (0.008 mole) of the β-ketosulfoxide, 2'-methyl-sulfinyl-4-methoxyacetophenone, are dissolved in 50 ml. of methyl alcohol containing 1.2 grams (0.0048 mole or 1.2 equivalents per mole of β-ketosulfoxide starting material) of iodine. The resulting solution is refluxed for 2 hours at approximately 60° C.

After reaction during the refluxing period, the solution is allowed to cool and the residual methyl alcohol is substantially removed by stripping it from the solution by evaporation under a water aspirator induced vacuum generating an absolute pressure equivalent to 20 mm. of mercury.

The solution with the methyl alcohol substantially removed is poured into 125 ml. of saturated aqueous thiosulfate solution, and the composite solution is extracted with three successive 50 ml. portions of chloroform. The chloroform extraction solution is then dried over anhydrous magnesium sulfate whereupon the chloroform is stripped from the extraction solution under water aspirator vacuum as was the methyl alcohol.

The α-dicarbonyl derivative product is vacuum distilled from the extraction residue to separate it from disulfide by-product and any remaining alcohol.

The distillation results in a 91% of theoretical yield, based on the amount of β-ketosulfoxide employed in the reaction, of an α-dicarbonyl derivative in the form of white crystals having a melting point of 63.5° C.–64.5° C. The α-dicarbonyl derivative is identifiable as the dimethyl-acetal of p-methoxyphenylglyoxal (1,1-dimethoxy-2-oxo-2-p-methoxyphenylethane) and exhibited a pleasant floral spice odor reminiscent of heliotrope.

EXAMPLE XI 8.8 grams (0.06 mole) of the β-ketosulfoxide, 2 methyl-sulfinyl-3-oxo-pentane, are dissolved in 50 ml. of methyl alcohol containing 8 grams (0.0048 mole or 1.1 equivalents per mole of β-ketosulfoxide starting material) of iodine and refluxed for 1.5 hours at 60–65° C.

After reaction during the refluxing period, the solution is allowed to cool and the residual methyl alcohol is substantially removed by evaporating it from the solution under a water aspirator induced vacuum generating an absolute pressure equivalent to 20 mm. of mercury. The solution with the methyl alcohol substantially removed is poured into 100 ml. of saturated aqueous sodium thiosulfate solution to accomplish neutralization, and the composite solution is extracted with three successive 50 ml. portions of chloroform. The chloroform extraction solution is then dried over anhydrous magnesium sulfate, whereupon the chloroform is stripped from the extraction solution under water aspirator vacuum as was the methyl alcohol.

The α-dicarbonyl derivative is distilled from the extraction residue to separate it from disulfide by-product as well as any remaining alcohol. The distillation yields 9.3 grams of an oily liquid identifiable by spectral means as the dimethyl-ketal of 2,3-dioxopentane which exhibits a butter-like odor.

EXAMPLE XII 5 grams (0.022 mole) of the β-ketosulfoxide starting material of Example I, 2-ketoundecyl methyl sulfoxide, are dissolved in 50 ml. of methyl alcohol containing 1 ml. of sulfuric acid. The solution is then heated and refluxed for 30 minutes whereupon the solution is cooled to room temperature. After cooling to room temperature, 1.23 grams of an aqueous solution, containing 30% by weight of hydrogen peroxide and providing 1 equivalent per mole of β-ketosulfoxide starting material, are added to the solution in a dropwise manner. The solution with the hydrogen peroxide added was stirred at room temperature for an hour before stripping the methyl alcohol from the solution by evaporation under water aspirator vacuum. The α-dicarbonyl product is then extracted from the solution with two successive 25 ml. portions of choloroform.

The combined portions of chloroform extraction solution are then dried over anhydrous magnesium sulfate and the chloroform is stripped off by evaporation under a water aspirator vacuum to yield 4.2 grams of product identifiable as 1,1-dimethoxy-2-oxo-undecane, the product of Example I.

EXAMPLE XIII 4.6 grams (0.02 mole) of 2-ketoundecyl methyl sulfoxide, the β-ketosulfoxide starting material of Example I are dissolved in 60 ml. of methyl alcohol containing 0.25 ml. of sulfuric acid. The solution is heated and refluxed for 1.0 hour prior to adding bromine in the amount of 1.76 grams (1.1 equivalents per mole of β-ketosulfoxide entering the reaction). The heating and refluxing is continued for 0.5 hour after the bromine addition.

After the refluxing period, the solution is allowed to cool, and the residual methyl alcohol is substantially removed by evaporating it from the solution under water aspirator induced vacuum.

The solution with the methyl alcohol substantially removed is poured into 100 ml. of saturated aqueous sodium thiosulfate solution, and the composite solution is extracted with three successive 50 ml. portions of chloroform. The combined portions of chloroform extraction solution are then dried over anhydrous magnesium sulfate. The chloroform is then evaporated from the extraction solution under water aspirator vacuum as was the methyl alcohol.

The α-dicarbonyl derivative, identifiable as 1,1-dimethoxy-2-oxo-undecane, the product of Example I, is distilled from the extraction residue in amount equivalent to an 84% theoretical yield based on the amount of β-ketosulfoxide starting material.

EXAMPLE XIV 10 grams (0.043 mole) of 2-ketoundecyl methyl sulfoxide, the β-ketosulfoxide starting material of Example I, are dissolved in 75 ml. of methyl alcohol. To this alcohol solution are added 2.2 grams (0.22 mole) of sulfuric acid and 3.93 grams (0.043 mole) of nitric acid in 25 ml. of water. The resulting solution is heated and refluxed at 65° C. for 1.0 hour. After the refluxing period, the solution is allowed to cool, and the residual methyl alcohol is substantially removed by evaporating it from the solution under a water aspirator induced vacuum.

After removal of the methyl alcohol, 100 ml. of ethyl acetate is added to the reaction mixture whereupon separation of the water and organic layer occurs. The organic layer is separated and collected from a separatory funnel, washed with 10 ml. of dilute sodium bicarbonate to insure neutrality and dried over anhydrous magnesium sulfate.

The ethyl acetate is then evaporated under a water aspirator vacuum to leave an oily residue consisting primarily of 1,1-dimethoxy-2-oxo-undecane.

EXAMPLE XV 10.3 grams (0.03 mole) of the β-ketosulfoxide, 2-ketononadecyl methyl sulfoxide, are dissolved in 100 ml. of methyl alcohol containing 5.0 grams (0.02 mole or 1.33 equivalents per mole of β-ketosulfoxide starting material) of iodine. The resulting solution is heated with provision for refluxing for 1.5 hours. After reaction during the refluxing period, the solution is allowed to cool, and the residual methyl alcohol is substantially removed by evaporating it from the solution under a water aspirator induced vacuum generating an absolute pressure equivalent to 20 mm. of mercury.

The solution with the methyl alcohol substantially removed is poured into 100 ml. of saturated aqueous sodium thiosulfate solution, and the composite solution is extracted with three succesive 50 ml. portions of chloroform. The composite portions of chloroform extraction solution are then dried over anhydrous magnesium sulfate, whereupon the chloroform is stripped off under water aspirator vacuum as was the methyl alcohol. After removal of the chloroform, the residual solution crystallizes to yield white waxy crystals of a product identifiable as 1,1-dimethoxy-2-oxo-nonadecane. The amount of product is equivalent to 44% of the theoretical yield calculated from the starting amount of β-ketosulfoxide.

EXAMPLE XVI 2 grams (0.01 mole) of the β-ketosulfoxide, 2'-methyl sulfinyl-4-fluoroacetophenone, are dissolved in 50 ml. of methyl alcohol together with 2.0 grams (0.008 mole or 1.6 equivalents per mole of β-ketosulfoxide starting material) of iodine. The solution is then heated with provision for reflux for 1.5 hours. After reaction during the refluxing period, the solution is allowed to cool, and the residual methyl alcohol is substantially removed by evaporating it from the solution under water aspirator vacuum.

The solution with the methyl alcohol substantially removed is poured into 100 ml. of saturated sodium thiosulfate solution, and the composite solution is extracted with three 50 ml. portions of chloroform. The composite portions of chloroform extraction solution are then dried over anhydrous magnesium sulfate, after which the chloroform is stripped from the extraction solution under water aspirator vacuum as was the methyl alcohol.

The α-dicarbonyl derivative is vacuum distilled from the residue to separate it from the disulfide by-product as well as any remaining alcohol. The distillation product is identified as 1,1-dimethoxy-2 - oxo - 2 - p - fluorophenylethane, which product exhibits a floral scent.

While specific examples of methods embodying the present invention have been described above, it will be apparent that many changes and modifications may be made in the methods of procedure without departing from the spirit of the invention. It will be understood, therefore, that the examples cited and the procedures set forth are intended to be illustrative only and are not intended to limit the invention.

Having thus described the invention, what is claimed is:

1. A process for the production of an α-dicarbonyl derivative from a β-ketosulfoxide having the structure

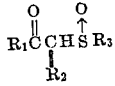

wherein $R_1$ is selected from the group consisting of alkyl, aryl and alkaryl containing 1 to about 18 carbon atoms, fluorophenyl and methoxyphenyl, $R_2$ is selected from the group consisting of hydrogen and saturated aliphatic hydrocarbon groups containing 1 to about 4 carbon atoms and $R_3$ is a saturated aliphatic hydrocarbon group containing 1 to about 4 carbon atoms, which process comprises the steps of:

(1) dissolving said β-ketosulfoxide in an acidic liquid medium therefor, which acidic liquid medium contains a member selected from the group consisting of primary and secondary acetal forming alcohols and water together with 1 to about 2 equivalents per mole of β-ketosulfoxide of an oxidizing agent selected from the group consisting of $I_2$, $Br_2$, $[NO_3^-$, $MnO_4^-$, $CrO_4^=]HNO_3$, $KMnO_4$, $K_2CrO_4$ and $H_2O_2$, and (2) reacting the solution so formed at a temperature of about 25° C. to about 100° C. with provision for reflux for a period of about 0.2 hour to about 2 hours.

2. The process of claim 1 wherein the oxidizing agent is $I_2$ and the acidic liquid medium contains methyl alcohol.

3. The process of claim 1 wherein the heating and reacting is carried out for a period of about 0.5 hour to about 1 hour.

4. The process of claim 1 wherein about 1.1 equivalents of the oxidizing agent selected from the group consisting of $I_2$, $Br_2$, $[NO_3^-$, $MnO_4^-$, $CrO_4^=]$ $HNO_3$, $KMnO_4$, $K_2CrO_4$ and $H_2O_2$ are present per mole of β-ketosulfoxide.

5. The process of claim 1 wherein $Br_2$ is the oxidizing agent and is added to the acidic liquid medium in step 2, subsequent to reaction and prior to the end of the reacting period.

6. The process of claim 1 wherein the acidic liquid medium for the β-ketosulfoxide contains water and inert solvent.

7. The process of claim 1 wherein an inert solvent is present in the acidic liquid medium of step 1.

8. The process of claim 1 wherein the acidic liquid medium of step 1 is rendered acidic by the addition of an acidic substance selected from the group consisting of dilute sulfuric, hydrochloric, perchloric and hydrobromic acids and sodium bisulfate salts.

References Cited

Kenney et al. J. Am. Chem. Soc. 83 4019–4022 (1961).

DANIEL D. HORWITZ, *Primary Examiner.*